US007027594B2

(12) United States Patent
Casey et al.

(10) Patent No.: US 7,027,594 B2
(45) Date of Patent: Apr. 11, 2006

(54) SYSTEM AND METHOD FOR COOLING OF NETWORK INTERFACE DEVICE

(75) Inventors: Steven M. Casey, Littleton, CO (US); Bruce A. Phillips, Erie, CO (US)

(73) Assignee: Qwest Communications International, Inc., Denver, CO (US)

( * ) Notice: Subject to any disclaimer, the term of this patent is extended or adjusted under 35 U.S.C. 154(b) by 206 days.

(21) Appl. No.: 10/611,324

(22) Filed: Jun. 30, 2003

(65) Prior Publication Data

US 2004/0264687 A1    Dec. 30, 2004

(51) Int. Cl.
*H04M 1/00* (2006.01)
(52) U.S. Cl. .................................. 379/413.02; 379/413
(58) Field of Classification Search ................ 379/413, 379/413.02
See application file for complete search history.

(56) References Cited

U.S. PATENT DOCUMENTS

| | | | |
|---|---|---|---|
| 4,961,220 A * | 10/1990 | Tentler et al. ............... | 379/413 |
| 5,202,765 A | 4/1993 | Lineberry | |
| 5,461,671 A * | 10/1995 | Sakuragi et al. ............ | 379/400 |
| 5,553,138 A | 9/1996 | Heald et al. | |
| 5,740,075 A | 4/1998 | Bigham et al. | |
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,209,025 B1 | 3/2001 | Bellamy | |
| 6,212,274 B1 * | 4/2001 | Ninh ........................... | 379/413 |
| 6,282,189 B1 | 8/2001 | Eames | |
| 6,299,526 B1 | 10/2001 | Cowan et al. | |
| 6,665,404 B1 * | 12/2003 | Cohen ......................... | 379/413 |
| 6,912,282 B1 * | 6/2005 | Karam ......................... | 379/413 |
| 2002/0076038 A1 * | 6/2002 | Barrese et al. .............. | 379/413 |
| 2003/0026416 A1 | 2/2003 | Fusco | |

OTHER PUBLICATIONS http://web.archive.org/web/20030410200336/http://www.sandman.com/telco.html.*
Frank, Edward and Holloway, Jack; "Connecting the Home with a Phone Line Network Chip Set", IEEE Micro, Mar.-Apr. 2000, pp. 2-14.

* cited by examiner

*Primary Examiner*—Jefferey Harold
(74) *Attorney, Agent, or Firm*—Townsend and Townsend and Crew LLP

(57) ABSTRACT

A network interface device (NID) for connecting a telecommunications line to a subscriber premises. The NID includes an enclosure that houses wiring, connectors, and active telecommunications devices. A cooling device, such as a fan, is used for cooling the active devices within the NID and is powered by a storage capacitor. The capacitor is charged by current from telecommunications signals on the telecommunications line using a power regulating circuit. The active devices within the NID generate heat, and the cooling device maintains a desired operating temperature within the NID. In one embodiment, the NID includes electronic components used for providing DSL service to the subscriber, and the lower frequency voice components of the telecommunications signals received at the NID are used for charging the capacitor. A microserver within the NID senses the current levels provided to the NID and to an active component module (e.g., DSL modem), and senses the electrical charge level at the storage capacitor. If current to the NID and DSL modem are insufficient, an alarm signal is generated. If the charge level at the storage capacitor is below a predetermined level, current from the telecommunications line is supplied to the capacitor.

26 Claims, 5 Drawing Sheets

SYSTEM AND METHOD FOR COOLING OF NETWORK INTERFACE DEVICE

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

Subscribers of telecommunications services receive those services from telecommunications providers via co-axial cable, twisted pair of copper wiring, optical fiber and other transmission or communications lines. The communications lines are brought to the subscriber (customer) premises and connected to wiring and components within the premises at an enclosure known as a network interface device (NID). The NID often serves as a demarcation point between the service provider network and the wiring at the subscriber premises, delineating the customer's responsibility (repair and maintenance of all wiring and other facilities on the subscriber side of the interface) and the service provider's responsibility (repair and maintenance of all wiring and other facilities on the network side of the interface).

As services have become more complex (beyond the provision of simple telephone services), the complexity of the NID has also increased. For example, the provision of high speed data service, such as digital subscriber line (DSL) service, over a traditional telephone (twisted pair) line requires the use of a DSL modem and sometimes other active electronic components (depending on the level of service). While those active components can be located within the customer premises, it is often desirable to locate them within the NID at the exterior of the customer premises. The exterior may be a convenient location for the service provider, e.g., when access is needed to add components and wiring in order to change or enhance service, and to maintain wiring and facilities without having to enter the subscriber premises.

When active components in a NID are located at the exterior of the subscriber premises, it becomes necessary to consider the operating conditions of the components, particularly dissipating heat generated during operation (as described herein, the term "active components" means electronic components that generate heat, usually because they are powered by electrical power—however, the present invention is not necessarily so limited). Under some circumstances, it may become necessary to provide active cooling (fans or other devices), which themselves require electrical power. While it is possible to power the active cooling devices from the subscriber premises (e.g., via connection to the customer's household power) or from the network over a network power line (e.g., separate from the communications line), such arrangements are costly to implement.

BRIEF SUMMARY OF THE INVENTION

Embodiments of the present invention are directed to a system and method for cooling a network interface device (NID) in a telecommunications network. The NID is located at the premises of the telecommunications subscriber, and connects a communications channel or line from the service provider network to the subscriber. The system includes a temperature controlling device and a power regulating or power supply circuit that uses power on the communications line to provide power for the temperature controlling device. In one embodiment, an electrical storage device (such as a capacitor) stores electrical power for the temperature controlling device, and a server selectively passes electrical power from the communications line to the storage device and from the storage device to the temperature controlling device. The temperature controlling device may be a cooling device, such as a fan. The communications line may be a telephone line (twisted pair of conductors) providing DSL service to the subscriber, and the NID includes an active electronic component or processing device, such as a DSL modem that is cooled when the temperature within the NID reaches a predetermined level.

In another embodiment of the invention, a method is provided for cooling a NID at a subscriber premises. The method includes the steps of providing a cooling device at the NID, powering the cooling device with electrical power from an electrical storage device, and using current from telecommunications signals received at the NID for storing electrical power at the electrical storage device.

DETAILED DESCRIPTION OF THE INVENTION

Figure 1:
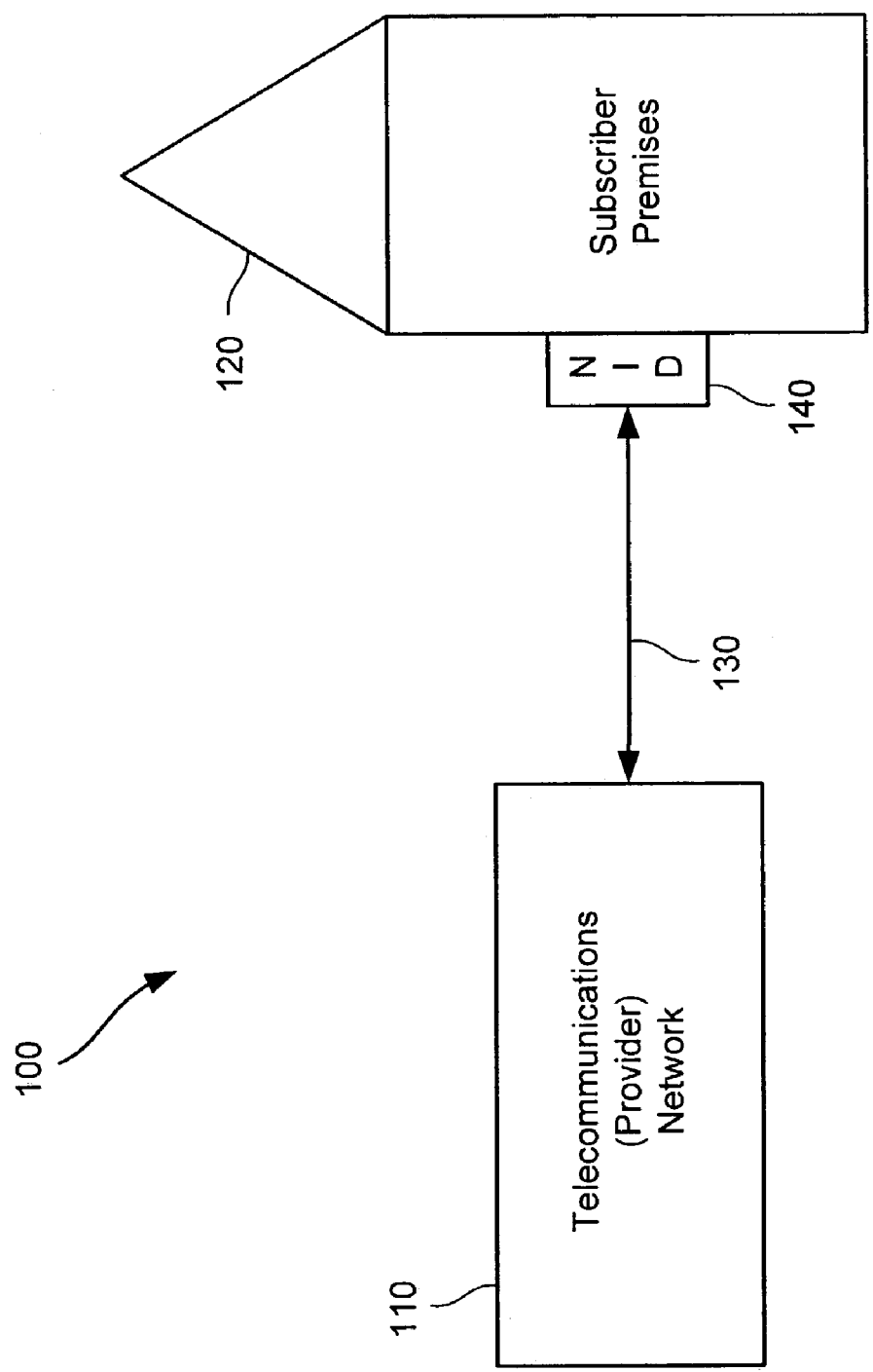
FIG. 1 is a simplified block diagram of an telecommunications network employing a network interface device (NID) in accordance with the present invention.

There are numerous configurations for implementing the present invention. One such possible configuration is seen in FIG. 1, wherein a network 100 includes a provider network 110 connected to a customer or subscriber premises 120 via a telephone line 130 and a network interface device (NID) 140. The provider network 110 may be a network maintained by a telephone company, including switches, terminals, cabling and other equipment used to facilitate the transmission of voice and data communications. In one embodiment, the line 130 is a single telephone line, i.e., a twisted pair of copper wires, and the NID 140 connects the line 130 (and the telephone network) to the wiring and equipment within the subscriber's premises. However, as will appreciated from the description to follow, the provider network 110 and line 130 could be implemented to encompass a wide variety of telecommunications systems and transmission or transport media in use today, such as coaxial cable (widely used for cable TV and data transmission), fiber optic lines, wireless transmission, and the equipment required for supporting such media. Further, as the scope of services offered by traditional service providers (e.g., telephone companies, cable TV companies, etc.) increases, the scope and nature of components and other equipment that may need to be resident at the NID also increases. An example of a NID for use with a number of services and transport media (and the required components and functionality within the NID) can be found in prior U.S. application Ser. No. 10/356,364, filed on Jan. 31, 2003, by Bruce A. Phillips, Kurt A. Campbell, Steven M. Casey, Charles I. Cook, Donald L. Brodigan and Qi Wang, and assigned by to the same assignee as the present application. Such prior application is hereby incorporated by reference.

The existence and location of the NID 140 has both technical and commercial significance. For example, the NID 140 may be viewed as the demarcation point or line between the provider network 110 and the subscriber premises 120, with the provider (i.e., telephone company) responsible for wiring and facilities on the network side of the NID and the subscriber responsible for the wiring and equipment on the subscriber side of the NID. For this reason, it is becoming more common for the NID to be located at the exterior of the subscriber premises, so that the service provider can access all wiring and equipment for which it is responsible, without having to enter the subscriber's premises.

The NID 140 will include wiring and devices as necessary for providing various services to the customer. While a traditional NID may consist of a connection point for connecting an outside telephone line to the inside wiring (e.g., if the customer is only receiving POTS—"plain old telephone service"), today there is a growing use of the NID to house other equipment and devices as the number of services provided to the customer increases and becomes more complex. For example, if the customer receives DSL (digital subscriber line) service over a twisted pair telephone line, the NID 140 may have active electronic components that are required for receiving and processing high speed, digital signals so that the customer has both POTS and high speed data service. These active components are usually required to have a source of electrical power for operation and a means to cool or dissipate the heat that is generated during operation.

Figure 2:
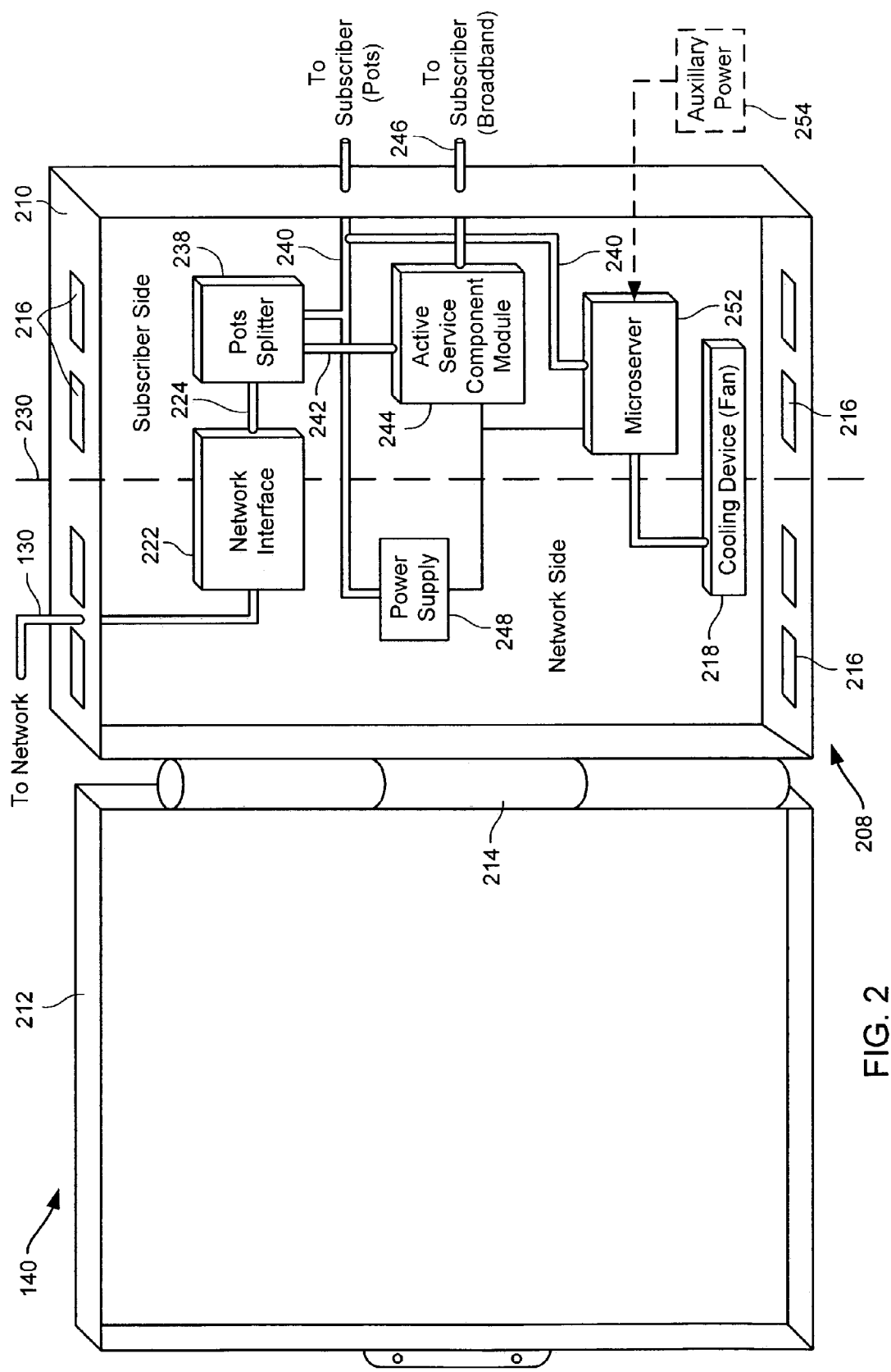
FIG. 2 illustrates a NID and the major components thereof, in accordance with the present invention.

Turning now to FIG. 2, there is seen in greater detail the NID 140. The NID 140 includes an enclosure 208 (primarily constructed of plastic in one embodiment) that has a base 210 and a lid 212, joined by a hinge 214 so that the NID can be opened for access (for purposes of repair, routine maintenance, adding/changing components for additional or changed service, etc.). A plurality of vents or openings 216 are located on the top and the bottom of the enclosure to permit ventilation and thereby dissipate heat from comments and wiring within the NID.

The amount of heat generated by the wiring and components within the NID 140 will depend on the service provided to the subscriber (the number of components and the nature of wiring within the NID will normally correspond to that level of service). In the case of POTS, with the NID providing a connection point between the line from the provider network and the customer's wiring, and perhaps circuit protectors (fuses, ground fault detectors, etc.), there may be minimal heat generated within the NID 140. However, in one embodiment of the NID 140 described herein, the service provided includes high speed broadband service, such as DSL, and the components needed for providing such service may generate, under certain circumstances, enough heat that it is desirable to provide various methods for dissipating the heat within the NID 140. Not only will the heat depend on the components within the NID 140, but also the location and environment of the NID. For example, if the NID is located on the south side of the customer premises, absorbed heat from the sun and the heat from components within the NID may together require more provision for cooling in order to keep the components within the NID at the desired operating temperatures. As a further example, during the summer months it may be more difficult to rely on a passive cooling arrangement (e.g., vents only) to maintain the desired temperatures within the NID. Accordingly, the NID 140 not only uses vents 216 for cooling, but may also use an active cooling device 218 (e.g., one or more light weight, low amp fans) to move air through or across components within the NID 140.

In FIG. 2, the line 130 from the service provider network enters the NID 140 and goes to a network interface 222, where it is connected to a subscriber's line 224. The network interface 222 provides an electrical connection point, with terminals (not seen) for connecting the line 130 to the line 224. However, from a service standpoint, the interface 222 also defines a demarcation point 230, with the line 130 and anything else on that side (i.e., the "network side") of the interface 222 being the responsibility of the service provider operating the network, and the line 224 and all wiring, components, equipment (e.g., telephones) and everything else on that side (the "subscriber side") of the interface being the responsibility of the subscriber.

The line 224 is provided to a conventional bi-directional POTS splitter 238 for use with DSL service, with the splitter separating low frequency POTS or voice signals, e.g., 40 HZ to 4 KHz, from higher frequency data signals, e.g., 25 KHz to 1.5 MHz, for Asymmetrical DSL (ADSL) service. The POTS signals are provided to a bi-directional POTS line 240 (which goes to the subscriber's telephone equipment) and the high speed DSL signals are provided over a bi-directional high frequency data line 242 to an active service components module 244, which may be a standard DSL modem or transceiver. The module 244 in turn provides high speed, broadband signals to equipment (e.g., the subscriber's personal computer) over a bidirectional high frequency digital data line 246. While the POTS splitter 238 and the module 244 are shown in FIG. 2 as separate components, it should be appreciated that those components (as well as other components seen in FIG. 2) may in fact be incorporated into a single integrated device (that single device receiving the single line 224 from the interface 222 and providing two subscriber lines, the POTS line 240 and the digital data line 246).

The active service components module 244 is illustrated as a separate component in FIG. 2 because in one embodiment it may be the single largest source of heat generated within the NID 140, due to the presence of active electronic components or circuitry.

The power for the module 244 is provided by the network (POTS signals on line 240 as passed through the splitter 238 from line 130) For example, if the POTS signals on line 240 are used, the conventional tip and ring signals used to operate standard telephones (usually −48V DC in the "on-hook" state, modulated voice signals superimposed on −48V DC when "off hook", and a ringer signal (90V AC, 20 Hz), are regulated by a power supply 248 to supply a relatively low voltage, DC current (e.g., 25 milliamps) to power the module 244, and in accordance with the illustrated embodiment of the invention, to also power the cooling device 218, as will be described in greater detail below.

The manner in which POTS signals are used by power supply 248 to provide a low voltage DC current is conventional, and circuits for accomplishing the same are well known to those skilled in the art. For example, U.S. Pat. No. 5,553,138, which is hereby incorporated by reference, shows one such power supply circuit for generating a filtered 3V direct current supply (from a POTS line), although those skilled in the art can readily appreciate that, depending on the power requirements of the module 244 and cooling device 218, the power supply 248 cold be readily modified to provide other needed DC voltages.

While not illustrated in the one embodiment of the NID 140 described herein, it should be understood that within the scope of the present invention, the power for module 244 may also be provided (with suitable power regulation) from the high frequency digital signals (on line 242) in lieu of or in addition to the lower frequency POTS signals (on line 240).

The NID 140 also includes a microserver 252 which monitors the temperature within the module 244 and controls the operation of the cooling device 218 (to be described in greater detail below in conjunction with FIGS. 3 and 4). The microserver 252 may also be powered with current from the power supply 248.

Also shown in FIG. 2 is an optional auxiliary power source 254 (e.g., a solar panel or a connection to household power at the subscriber premises), which can be used in addition to the power from power supply 248. Network power (i.e., current from line 130 from the network used by power supply 248) in some circumstances may be insufficient to operate the cooling device 218, for example, if the NID 140 is located on a south-facing side of the customer premises. During periods of sun, when solar heat is absorbed within the NID (and combined with heat generated from the module 244), additional current may be needed to power cooling device 218. A solar panel (or household power) may be used to provide that additional current to operate the cooling device 218. However, in the embodiment of the invention described in conjunction with FIG. 2, involving normal placement and use of the NID 140 (e.g., when shielded from or placed away from the sun, and with NID 140 having only those components needed for providing standard telephone and ADSL service), the network power over line 130 should be sufficient to power both the module 244 and the cooling device 218. However, if the subscriber subsequently adds additional services and equipment, e.g., encoders for cable TV, components for VDSL (Very high bit-rate DSL) service, routers, switches and other devices requiring greater power), the NID 140 can be designed for optional connection to the auxiliary power source 254, if and when that external power source (e.g., a solar panel or household power from the subscriber premises) becomes necessary.

It should be pointed out that, for ease of illustration, not all the interconnections between the various components within NID 140 are shown in FIG. 2, although those interconnections will be understood from the descriptions to follow. Further, while for convenience the power supply 248 is illustrated in FIG. 2 on the "network side" of the NID, the power supply may be more likely located on the "subscriber side".

Figure 3:
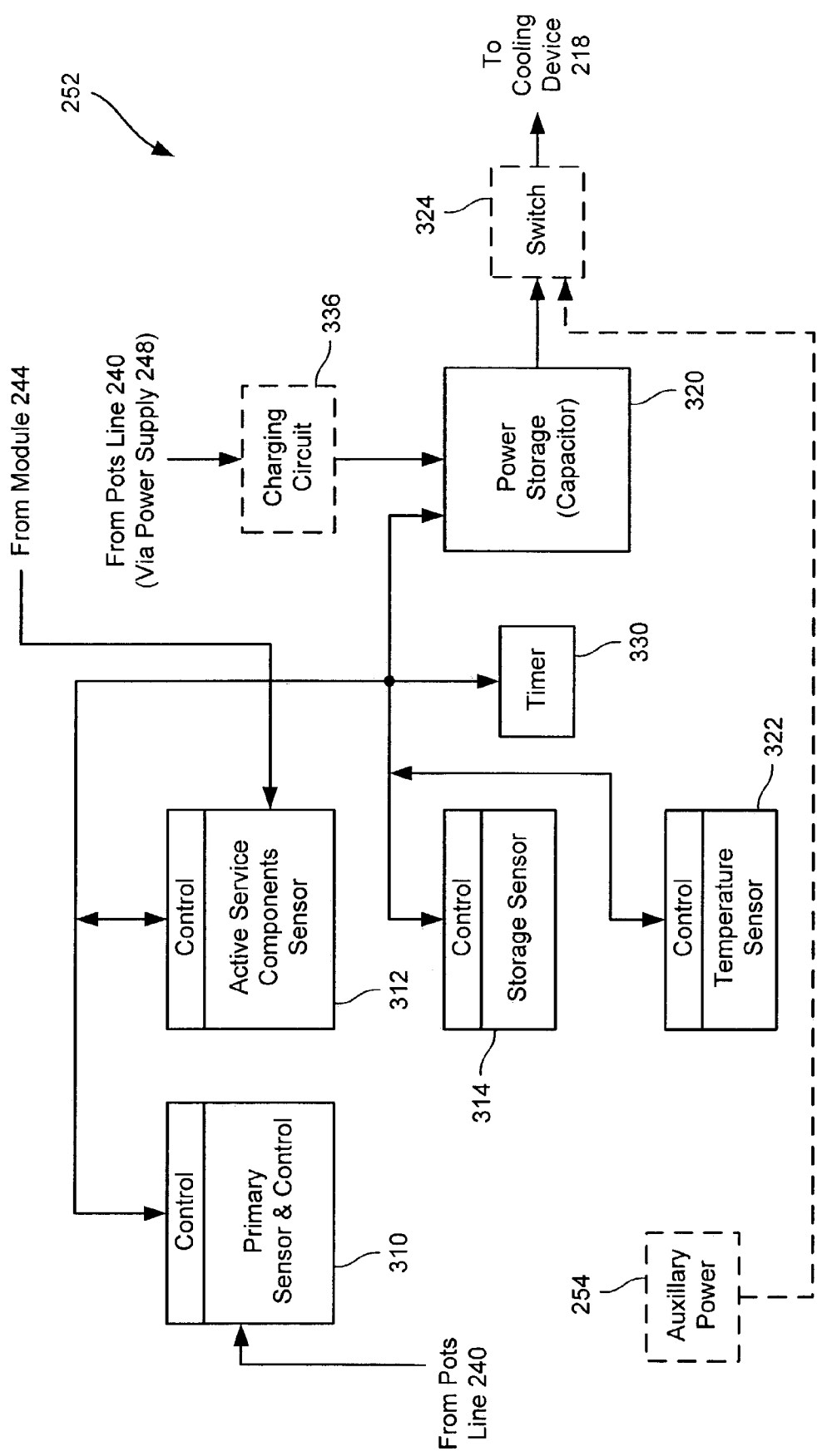
FIG. 3 is a schematic diagram of the microserver seen in FIG. 2.

Turning now to FIG. 3, the microserver 252 is shown in greater detail. The microserver includes three current sensors 310, 312 and 314, and control logic associated with each. The microserver further includes an electrical storage device or capacitor 320 (for storing and providing power to the cooling device 218) and a temperature sensor 322 for sensing the temperature within the NID 140 (e.g., as a result of heat being generated by the module 244).

The current sensor 310 senses the primary current being provided to power the NID, i.e., the network power provided as current from the POTS line 240 and as needed by both the module 244 and the cooling device 218 (and by equipment within the subscriber premises 120). The sensor 312 measures the current being provided to the active component service module 244. The storage sensor 314 measures the current or charge stored on the storage capacitor 320.

Also seen in FIG. 3 is the auxiliary power source 254, which can be optionally used to power either module 244 or cooling device 218 when the network power is insufficient for that purpose (as described earlier), and a switch 324 for passing power (current) from capacitor 320 to the cooling device 218 and, if there is an auxiliary power source 254, for switching between current from the capacitor 320 and current from the auxiliary power source 254. A timer 330 is used to cause periodic charging of the capacitor 320 with current from POTS line 240. An optional charging circuit 336 (to be described in more detail below in conjunction with FIG. 5) may be used to charge capacitor 320 if the voltage required at capacitor 320 to power the cooling device 218 exceeds the voltage provided by power supply 248 (e.g., needs to be greater than 3 volts).

The microserver determines (at sensor 310) the level of current available on the POTS line 240 for powering the NID and the subscriber's equipment. It also determines (at sensor 312) the current being provided to the module 244 and determines (at sensor 314) current stored at and available from the capacitor 320, and enables the POTS line to charge the capacitor 320 when there is sufficient power available from the POTS line. The microserver further senses the temperature within the NID 140 (at the temperature sensor 322), and causes the capacitor 320 to discharge (and power cooling device 218) when the temperature reaches a level (e.g., 50° C.) at which heat build-up within the NID needs to be removed in order to maintain desired thermal operating conditions.

The control logic associated with each of the sensors 310, 312, 314 and 322 can each be a programmed logic device (logic gates, EPROM, etc.). Further, while FIG. 3 shows a separate control at each sensor and interconnected, it will be appreciated that a single control device (e.g., a microprocessor) can be used, with the microprocessor programmed to operate the microserver 252 as described herein. The actual operation of the microserver (and the steps carried out by the control within the microserver, whether provided centrally or at the various sensors), will be described below in conjunction with FIG. 4.

The program control and operation of the microserver 252 will now be described with reference to FIG. 4. After the program control is initiated, the sensor 312 first determines (step 412) if the active service component module 244 is drawing an expected or normal amount of current. The expected current used by the module 244—a DSL modem in the described embodiment—would be about 15 milliamps (at 1 watt). If the module 244 is not drawing the expected current, then at step 414 an alarm signal is generated—for example, to power a warning indicator light (not shown) on the exterior of the NID 140—since the lower draw of current likely indicates a malfunction within the module 244. The microserver continues to monitor the current draw and provide the alarm signal at step 414 until the current draw is normal.

If there is a normal current draw at step 412, then the microserver determines at step 416 whether there was previously a lower than expected current draw (i.e., at step 412), and if so, deactivates (step 418) the alarm signal previously provided at step 414. If there was not previously a lower than expected current draw, then the microserver at step 424 determines (at sensor 310) whether the primary current draw from POTS line 240 is normal, i.e., within a range sufficient to power not only the NID (including the active service component module 244, microserver 252, and the cooling device 218) but also the subscriber equipment (e.g., telephones). For the embodiment shown in FIG. 2, a current draw within a range close to 25 milliamps (±1 milliamp) would be sufficient draw of current at step 424.

If the current draw at step 424 is not normal, then an alarm signal is generated at step 426, e.g., to activate a separate warning indicator light (not shown) at the exterior of the NID 140, indicating that the network is not providing sufficient power to the NID, and that the attention of a network technician is required. The microserver then continues to check the primary current draw at step 424 until the current draw is normal. In addition, if there is insufficient primary current and if the NID 140 has been connected to the optional auxiliary power source 254 (FIGS. 2 and 3), the auxiliary power switch 324 can be set to connect the auxiliary power source to the NID (in order to power the NID and, if necessary, the subscriber's equipment).

When the primary current draw has been determined to be normal, the microserver at step 430 determines whether the primary draw was previously (step 424) below normal or insufficient, and if so, at step 432 deactivates the alarm signal previously generated at step 426.

Next, the storage sensor 314 determines the charged state of the capacitor 320 at step 440. If it is not fully charged, then current from the POTS line 240 is used to supply current (through power supply 248) to the capacitor 320 (step 442) until it is fully charged, at which point the microserver waits a predetermined period of time as controlled by timer 330 ("timed delay" at step 446) and checks the level of charge again at step 440. In the described embodiment where the NID 140 has a typical placement and use, and has one fan (cooling device 218) requiring approximately 1 watt, the storage capacitor 320 may have a total capacitance of 30–60 microfarads and, presuming the availability of 10 milliamps out of a total approximately 25 milliamps from POTS line 240, the timed delay at step 446 for checking the charge of capacitor 320 could be approximately five minutes (i.e., checking the charge level every five minutes and supplying charge to the capacitor 320 if needed). It should be appreciated that the microserver could be programmed to check the capacitor 320 at more or less frequent intervals, depending on the storage capacity of the capacitor and the thermal operating conditions at the NID 140 (at higher temperatures, it may be advisable to check the capacitor 320 more frequently). While not shown in FIG. 4, it should be appreciated that concurrently with the process illustrated, the capacitor 320 could be discharged as needed to operate the cooling device 218, based on the microserver determining (at temperature sensor 322) that the temperature within the NID 140 has reached a point where active cooling is required. Thus, independently of the periodic checking of the capacitor as controlled by step 446, the capacitor 320 will be automatically recharged at step 442 anytime the capacitor is used to power the cooling device (state 448 in FIG. 4).

Figure 4:
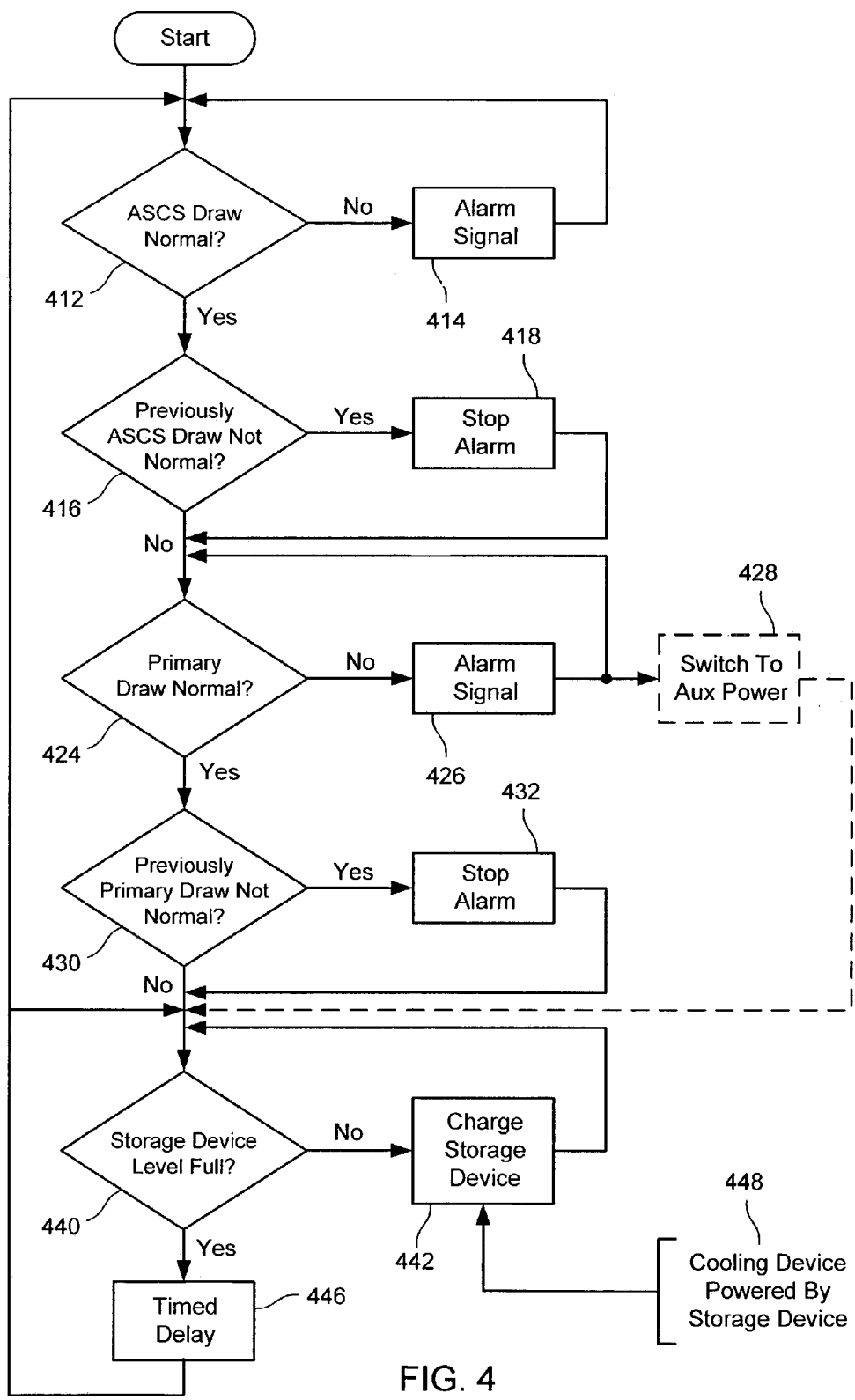
FIG. 4 is a flow diagram illustrating the operation of the microserver.

As also illustrated in FIG. 4, after the timed delay has occurred at step 446, the process illustrated in FIG. 4 may repeat (by again checking the current draw at step 412).

Figure 5:
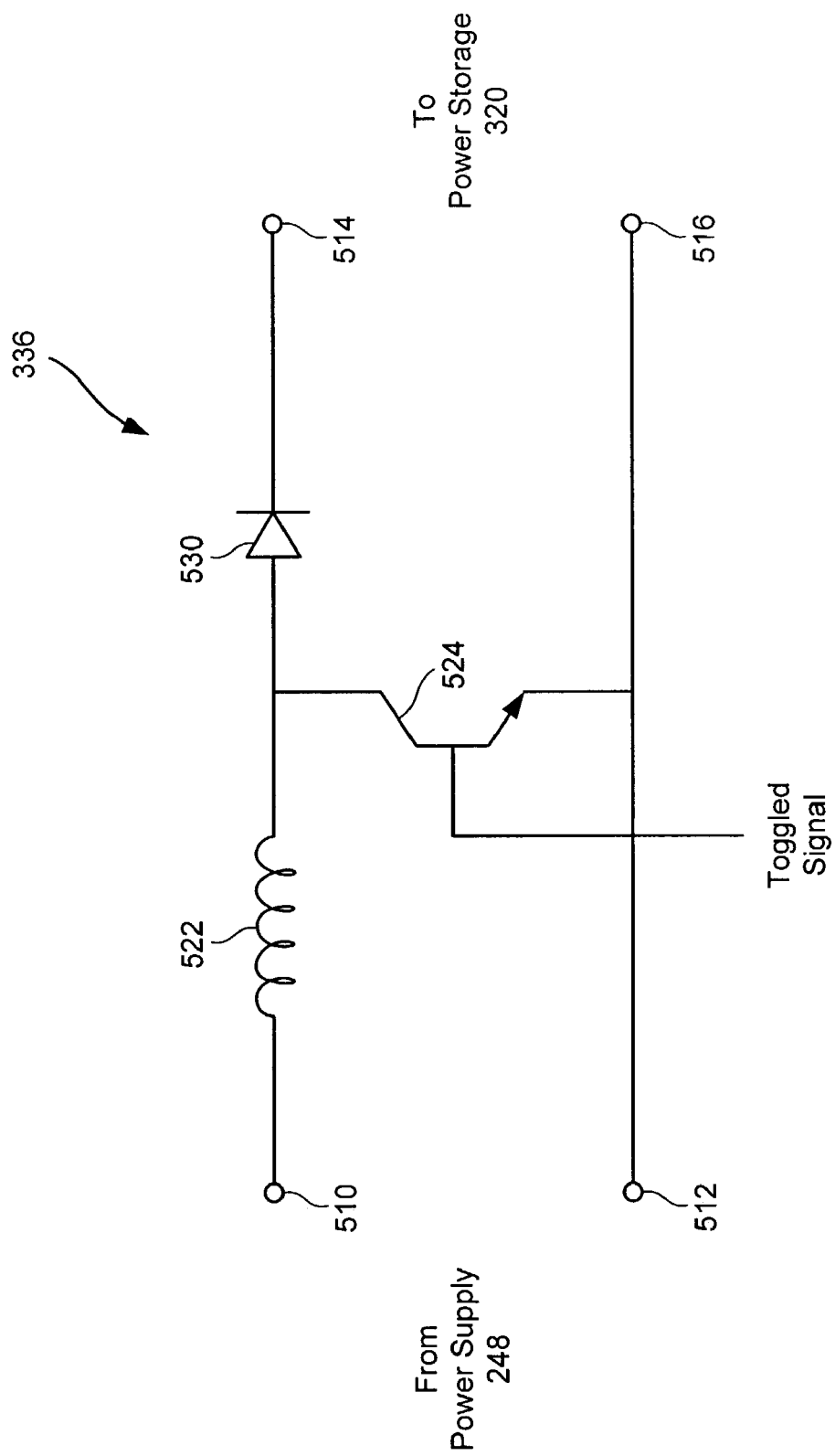
FIG. 5 is a simplified schematic view of the optional charging circuit shown in FIG. 3.

The charging circuit 336 is illustrated in FIG. 5 and may be used when the cooling device 218 requires a higher voltage than the voltage provided by power supply 248. For example, the cooling device may consist of a bank of fans (rather than a single fan), and a higher voltage than, say, the 3 volts provided by power supply 248 may be required to power the fans. The circuit in FIG. 5 is a conventional charging circuit (sometimes referred to as a "step up" or "boosting" circuit), consisting of an inductor 522, a transistor 524 and a diode 530. The transistor 524 is toggled on and off repeatedly, resulting in the voltage across input terminals 510, 512 (from the power supply 248) being boosted to a higher voltage across the output terminals 514, 516 (connected to the power storage capacitor 320). When the transistor 524 is toggled on (conducting), the current flow (from the power supply 248) ramps up through the inductor. When the transistor is toggled off (an open circuit), the voltage at the point between the inductor 522 and diode 530 increases dramatically, and the inductor 522 passes current through diode 530, resulting in a larger voltage appearing across the output (terminals 514, 516). The longer this process goes on, the greater the voltage provided to capacitor 320 (the voltage can be made to increase from 3V at the input to a power supply output voltage of 10–15V or higher). While the forgoing optional method of charging capacitor 320 is not illustrated in the control method process of FIG. 4, it will be appreciated that it could be readily implemented as part of the control logic implementing the capacitor charging step 442.

It should be appreciated that, while the capacitor 320 and the charging circuit 336 are illustrated as separate components and as each part of the microserver 252, either one or both of the capacitor 320 and charging circuit 336 could be readily incorporated into power supply 248.

In the one embodiment of the microserver 252 described herein, it is assumed that the microserver 252 is pre-programmed to control the operation of the various sensors, the charging of the storage capacitor 320, and the discharge of the capacitor 320 for powering the cooling device 218. However, it should be appreciated that such programming can be downloaded to the NID 140 remotely from the network over the line 130. Such remote provided programming can be based on the network service provider conducting remote testing and diagnostics for determining the nature of the active components within the NID 140, and also receiving data from the NID reflecting operational conditions. For example, data representing temperatures (at temperature sensor 322) sampled over a predetermined period of time can be transmitted to the network service provider and used to anticipate the need for cooling, and the programming code (such as needed for controlling the desired level of charge at capacitor 320, and the optimum frequency for checking the level of the charge at the capacitor 320 and supplying charging current at steps 440, 442 and 446) can be provided by the service provider over line 130 to the microserver 252.

While the network 100 is described as a telephone network, with line 130 being a twisted pair of copper wires, it should be appreciated that the invention can be used in other types of networks, including (but not limited to) those employing coaxial and fiber optic cables and wireless transmission. Further, while the active cooling device is described as a fan, other forms of cooling may be employed, such as powered vents (opening when cooling is needed) and refrigerated systems (operated when substantial heat build up is present or anticipated within the NID).

Also, rather than the capacitor 320, the storage device for powering the cooling device could be implemented using a re-chargeable battery, with the battery charged when placed in the NID 140 and periodically re-charged as described above in relation to the capacitor 320.

Further, while the embodiment shown is primarily concerned with powering the cooling device 218, any one or all of the components and devices forming the NID 140 can be advantageously powered from the network by power supply 248 (using current from line 130 provided to power supply 248).

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for controlling the temperature in a network interface device that is located at a subscriber premises and that connects a communications channel in a communications network to the subscriber premises, the system comprising:
    a temperature controlling device;
    a storage device for storing electrical power that may be used for powering the temperature controlling device; and
    a programmed server for selectively passing electrical power from the communications channel to the storage device when the electrical power at the storage device falls below a predetermined level and for selectively passing electrical power from the storage device to the temperature controlling device in response to a predetermined temperature within the network interface device.

2. The system of claim 1, further comprising a power regulating circuit for generating electrical power from the communications channel, whereby the electrical power may be passed by the server to the storage device.

3. The system of claim 1, further comprising an auxiliary power source that may be used for powering the temperature controlling device when the power from the communications channel is insufficient for powering the temperature controlling device.

4. The system of claim 3, wherein the auxiliary power source is a solar panel.

5. The system of claim 3, wherein the auxiliary power source is a household electrical power source at the subscriber premises.

6. The system of claim 1, wherein the communications channel is a telephone line comprised of a twisted pair of wires.

7. The system of claim 1, wherein the communications channel is a coaxial cable.

8. The system of claim 1, wherein the storage device is a capacitor.

9. The system of claim 1, wherein the network interface device comprises a processing device for processing signals received over the communications channel, and wherein the temperature controlling device dissipates heat generated during operation of the processing device.

10. The system of claim 9, wherein the communications channel comprises a telephone line having a twisted pair of conductors, and wherein the processing device comprises DSL modem.

11. The system of claim 9, wherein the temperature controlling device comprises a fan.

12. The system of claim 11, wherein the server comprises a temperature sensor for sensing the temperature at the processing device and for causing the temperature controlling device to be activated when the temperature at the processing device reaches a predetermined level.

13. The system of claim 1, wherein the network interface device is located at the exterior of the subscriber premises.

14. The system of claim 1, wherein the communications channel is a telephone line comprised of a twisted pair of conductors, wherein the telephone line carries telecommunications signals for providing telecommunications services to the subscriber premises, and wherein the telecommunications signals are used to provide electrical current that may be stored at the storage device.

15. The system of claim 14, wherein the telecommunications services comprise digital subscriber line (DSL) service using both low frequency signals that may provide voice communications and high frequency signals that may provide data communications, and wherein the low frequency signals are regulated for providing the electrical power.

16. In a telecommunications network wherein a service provider network provides telecommunications services to a subscriber over a telecommunications line connected to a network interface device (NID) at the subscriber premises, a system for cooling the NID comprising:
    temperature controlling means for controlling the temperature at the NID;
    storing means for storing electrical power at the NID; and
    programmed server means at the NID for selectively passing electrical power from the telecommunications line to the storing means when the electrical power at the storage device falls below a predetermined level, so that the storing means may be used to provide electrical power to the temperature controlling means, and for selectively passing electrical power from the storing means to the temperature controlling means in response to a predetermined temperature within the NID.

17. The network of claim 16, wherein the telecommunications line is a twisted pair telephone line, wherein the telephone line carries telecommunications signals for providing both voice service and data service to the subscriber, wherein the NID further comprises processing means that generate heat when using the telecommunications signals to provide the data service, and wherein the telecommunications signals have electrical current that may be selectively passed by the server means to the storing means for use in powering the temperature controlling means, thereby dissipating heat generated at the processing means.

18. The system of claim 16, further comprising auxiliary power means for supplementing the electrical power at the storing means.

19. A method for cooling a network interface device (NID) located at a subscriber premises, the NID connecting a telecommunications line to the subscriber premises, the method comprising:
    providing a temperature controlling device at the NID;
    powering the temperature controlling device with electrical power from a storage device at the NID;
    using current from telecommunications signals on the telecommunications line to store electrical power at the storage device;
    providing a programmed server at the NID; and
    using the server for:
        periodically checking the level of power stored at the storage device, and selectively passing current on the telecommunications line to the storage device when the level of power stored is below a predetermined level;

sensing the temperature at the NID; and powering the temperature controlling device when the temperature at the NID reaches a predetermined level.

20. The method of claim 19, wherein the temperature controlling device is a cooling device.

21. The method of claim 20, wherein the telecommunications line provides DSL service to the subscriber premises, wherein the NID includes a DSL device, and wherein the cooling device is powered to dissipate heat at the DSL device.

22. The method of claim 21, wherein the NID includes subscriber telecommunications devices, wherein the subscriber premises includes subscriber equipment, and wherein the method further comprises:

sensing the current level on the telecommunications line;

providing an alarm signal if the current level on the telecommunications line is insufficient to properly power the devices within the NID and the equipment within the subscriber premises.

23. The method of claim 19, further comprising:

supplementing the power from the storage device with power from an auxiliary power source, when the power from the storage device is insufficient to power the temperature controlling device.

24. A system for powering and controlling the temperature of a network interface device (NID) that is located at a subscriber premises, wherein the NID connects a telecommunications line from a telecommunications network to the subscriber premises, wherein the NID includes at least one active service device used in providing telecommunications service to the subscriber, and wherein the subscriber premises includes subscriber equipment, the system comprising:

a temperature controlling device;

a storage device for storing electrical power that may be used for powering the temperature controlling device; and a programmed server for selectively passing electrical power from the telecommunications line to the storage device when the stored electrical power at the storage device is below a predetermined level, for selectively passing electrical power from the storage device to the temperature controlling device in response to a predetermined temperature at the active service device, and for sensing the electrical current level on the telecommunications line and providing an alarm signal if the current level is insufficient to power the active service device, the subscriber equipment, and the temperature controlling device.

25. The system of claim 24, wherein the server repeats the sensing of the stored electrical power at the storage device and the sensing of the electrical current level on the telecommunications line, after a predetermined period of time.

26. The system of claim 25, wherein the server further senses the electrical current level being drawn by the active service device within the NID.

* * * * *